(12) United States Patent
Lujan et al.

(10) Patent No.: US 11,866,605 B2
(45) Date of Patent: Jan. 9, 2024

(54) ACRYLIC MODIFIED POLYMERIC OPACIFIERS FOR USE IN ORGANIC MEDIA

(71) Applicant: Arkema Inc., King of Prussia, PA (US)

(72) Inventors: Donovan K. Lujan, Holly Springs, NC (US); Wayne Devonport, Apex, NC (US)

(73) Assignee: Arkema Inc., King of Prussia, PA (US)

( * ) Notice: Subject to any disclaimer, the term of this patent is extended or adjusted under 35 U.S.C. 154(b) by 215 days.

(21) Appl. No.: 17/442,346

(22) PCT Filed: Mar. 24, 2020

(86) PCT No.: PCT/US2020/024438
§ 371 (c)(1),
(2) Date: Sep. 23, 2021

(87) PCT Pub. No.: WO2020/205332
PCT Pub. Date: Oct. 8, 2020

(65) Prior Publication Data
US 2022/0177723 A1    Jun. 9, 2022

Related U.S. Application Data

(60) Provisional application No. 62/829,067, filed on Apr. 4, 2019.

(51) Int. Cl.
*C09D 7/65* (2018.01)
*C09D 161/02* (2006.01)

(52) U.S. Cl.
CPC ................... *C09D 161/02* (2013.01)

(58) Field of Classification Search
CPC ........ C09D 161/02; C09D 5/004; C09D 7/20; C09D 7/65; C09D 7/70; C09D 151/003; C09D 167/08; B01J 13/14; B01J 13/203; B01J 13/22; C08F 285/00; C08F 220/14; C08L 51/003
USPC ....................................................... 523/201
See application file for complete search history.

(56) References Cited

U.S. PATENT DOCUMENTS

| | | | |
|---|---|---|---|
| 4,450,247 A | 5/1984 | Crockatt et al. | |
| 4,985,064 A | 1/1991 | Redlich et al. | |
| 5,447,560 A | 9/1995 | Vogel | |
| 9,102,775 B2 | 8/2015 | Bardman et al. | |
| 10,351,689 B2* | 7/2019 | Liu | C08F 285/00 |
| 11,161,990 B2* | 11/2021 | Olesen | C08F 285/00 |
| 2006/0234076 A1* | 10/2006 | Takamatsu | C08J 5/18 |
| | | | 428/522 |
| 2009/0162558 A1 | 6/2009 | Bardman et al. | |
| 2017/0233518 A1 | 8/2017 | Liu et al. | |
| 2018/0002558 A1 | 1/2018 | Tomko et al. | |
| 2019/0002710 A1 | 1/2019 | Olesen et al. | |

FOREIGN PATENT DOCUMENTS

| | | |
|---|---|---|
| WO | WO2016028511 A1 | 2/2016 |
| WO | WO2016073260 A1 | 5/2016 |
| WO | WO2017023830 A1 | 2/2017 |
| WO | WO 2018092158 A1 | 5/2018 |

* cited by examiner

*Primary Examiner* — Hannah J Pak
(74) *Attorney, Agent, or Firm* — Lynn B. Morreale

(57) ABSTRACT

Disclosed are voided latex particles, useful as opacifying agents for coating compositions containing organic solvents. The particles have a hollow interior, which substantially maintains its integrity after the particles are placed in contact with an organic solvent at 25° C. for 30 days. The particles also have a hydrophilic polymeric interior shell surrounding the hollow interior that is swellable with an aqueous swelling solution. The particles have first and second polymeric intermediate shells, surrounding the interior shell, formed from polymers that are different from each other and different from the interior shell polymer. Finally, the particles have an outer polymeric shell, surrounding the interior shells, which is formed from up to 100% by weight, as polymerized units, of methyl methacrylate. The interior shells and the outer shell each have a Tg greater than 60° C. Also disclosed is a multi-stage emulsion process for making the particles.

2 Claims, 3 Drawing Sheets

ACRYLIC MODIFIED POLYMERIC OPACIFIERS FOR USE IN ORGANIC MEDIA

This application is a national stage application under 35 U.S.C. § 371 of PCT/US2020/024438 filed Mar. 24, 2020, which claims benefit to U.S. patent application Ser. No. 62/829,067, filed Apr. 4, 2019, incorporated herein by reference.

FIELD OF THE INVENTION

The invention relates to poly (methyl methacrylate) (PMMA) modified "voided" or "hollow" latex particles useful as non-film forming opacifiers in coating compositions comprising organic solvents, such as alkyd paints or coatings. The invention also relates to emulsion polymerization processes for forming these particles and coating compositions that contain them.

BACKGROUND OF THE INVENTION

Polymeric hollow latex particles, also referred to as "core-shell" polymeric latex particles prior to expansion, have been used as opacifiers in water-based coating compositions as a cost-effective full or partial replacement for more-expensive opacifiers such as titanium dioxide. The particles also can reduce the weight of the final dried water-based coating compared to certain non-hollow pigments, opacifiers and extenders. The hollow latex particles can also impart excellent opacity, gloss, brightness and whiteness to the final dried water-based coating.

These particles are effective opacifiers due to their light-scattering property, which comes from the difference in refractive index between the air contained in their interior hollow core and their outer shell. Therefore, it is important that the particles retain their shape and do not collapse over time during storage in a solvent, even at elevated temperatures. Typically the outer shell is comprised of one or more layers of an emulsion-polymerized latex polymer. As noted above, these particles have been used in water-based coating compositions. Since the exterior polymeric coating layer is not attacked by water, the particles retain their integrity and interior void and therefore retain their opacifying property in the coating composition during storage.

However, there are few polymers that are cost-effective, are able to be easily incorporated into typical latex emulsion processes that are used to form these particles and, importantly, have long-term resistance to common organic solvents that can be used in non-water-based coating compositions, such as odorless mineral spirits, that are used in alkyd coating compositions, for example. Typical polymeric opacifiers do not have sufficient resistance to organic solvents and therefore collapse and lose hiding power once exposed to an organic medium. Such particles therefore have no significant shelf life (usually less than three days) when incorporated into coating compositions comprising an organic medium.

Other workers' efforts to produce polymeric particles that are resistant to organic solvents are summarized as follows:

European Patent No. EP 2072542 B1 discloses the use of monomers containing cyano functionality, amide functionality, or mixtures thereof in the shell portion of hollow core-shell particles to provide solvent resistance so that the particles can be used as opacifiers in a formulation comprising an organic medium such as mineral spirits.

U.S. Pat. No. 9,102,775 B2 discloses a composition comprising an organic medium with hollow core-shell particles with a shell having a calculated shell-organic medium interaction parameter greater than 1.15, where the interaction parameter is calculated from the Hildebrand solubility parameters of both the solvent and the individual monomers that make up the polymer of the shell of the hollow core-shell particles.

U.S. Pat. No. 4,985,064 discloses a method of preparing hollow core-shell particles with a shell that can comprise, inter alia, poly (methyl methacrylate) on the outer shell. However, the disclosure specifically cautions that such particles cannot be used in an organic solvent if the outer shell is soluble in the organic solvent.

Thus there is clearly a need for cost-effective and simple-to-prepare hollow core-shell particles useful as opacifiers in organic media.

SUMMARY OF THE INVENTION

The invention relates to voided polymeric "core-shell" particles and processes for forming such particles. The particles comprise a hollow interior, an interior shell surrounding the hollow interior, at least one intermediate shell layer surrounding the interior shell, and an outer layer comprising, as polymerized units, methyl methacrylate. This outer layer may be between 1 and 100 nm thick. The particles are useful as opacifiers in organic media and show surprising long-term resistance to organic solvents.

The present invention thus provides for voided latex particles, comprising, from the interior outwards:

a hollow interior, wherein the hollow interior substantially maintains its integrity after the particle is placed in contact with an organic solvent at 25° C. for 30 days;

an interior shell comprised of a first polymer, wherein the first polymer is hydrophilic and swellable with an aqueous swelling solution;

a first intermediate shell comprised of a second polymer different from the first polymer wherein the second polymer comprises, as polymerized units, one or more free radical polymerizable hydrophilic monoethylenically unsaturated monomers and one or more free radical polymerizable non-ionic monoethylenically unsaturated monomers;

a second intermediate shell comprised of a third polymer different from the first polymer and the second polymer wherein the third polymer comprises, as polymerized units, one or more free radical polymerizable non-ionic monoethylenically unsaturated monomers, and wherein the third polymer has a Tg of at least 60° C.; and an outer shell comprised of a fourth polymer different from the first, second and third polymers, wherein the fourth polymer comprises, or consists of, or consists essentially of, as polymerized units, up to 100% by weight of methyl methacrylate and optionally between 0 and 10 weight %, or between 0 and 9 weight % or between 0 and 8 weight %, or between 0 and 7 weight %, or between 0 and 6 weight %, or between 0 and 5 weight %, or between 0 and 4 weight %, or between 0 and 3 weight %, or between 0 and 2 weight %, or between 0 and 1 weight %, or between 0 and 0.5 weight % of a co-monomer, and wherein the fourth polymer has a Tg of at least 60° C.

The outer shell may have a thickness between 10 nm and 50 nm, or between 1 nm and 100 nm.

When the voided latex particles are formulated into an alkyd coating composition having the composition described below, which is then stored for 30 days at 25° C., a dried film produced from the stored composition has a Y Reflectance value of at least 25 when measured according to ASTM D2805-11 (2018). Further, the dried coating composition produced from the stored coating composition retains at least 75% of the Y Reflectance of a dried coating composition formed from the coating composition prior to being stored, or after being stored for 1 day.

For ASTM D2805-11 (2018) testing purposes, the alkyd coating composition, prior to being used to form a dried film or coating, consists of:
a) 19.5 weight percent of an aqueous suspension comprising 30 wt % of the voided latex particles,
b) 58.6 weight percent of a long oil alkyd comprising 70 wt % solids in odorless mineral spirits,
c) 19.5 weight percent of odorless mineral spirits,
d) 0.1 weight percent of an emulsifier comprising 2-amino-2-methyl propanol, and
e) 2.1 weight percent of a drier package comprising cobalt bis (2-ethylhexanoate); 2,2'-bipyridyl; calcium bis (2-hexanoate); 2-ethylhexanoic zirconium salt; and
f) 0.2 weight percent of butanone oxime.

The invention also provides for a process for forming such voided latex particles. The process comprises the steps of:

A) contacting an aqueous swelling solution with multi-stage emulsion polymer particles during the production of the multi-stage emulsion polymer particles, wherein the multi-stage emulsion polymer particles comprise from the interior outwards:
i) a core comprised of a first polymer wherein the first polymer is hydrophilic and swellable with the aqueous swelling solution;
ii) a first intermediate shell comprised of a second polymer different from the first polymer wherein the second polymer is permeable to the aqueous swelling solution and comprises, as polymerized units, one or more hydrophilic monoethylenically unsaturated monomers and one or more non-ionic monoethylenically unsaturated monomers;
iii) a second intermediate shell comprised of a third polymer different from the first polymer and the second polymer, wherein the third polymer is permeable to the aqueous swelling solution, has a Tg of at least 60° C. and comprises, as polymerized units, one or more non-ionic monoethylenically unsaturated monomers;

B) allowing the aqueous swelling solution to swell the core during the polymerization of the second intermediate shell;

C) when the polymerization of the second intermediate shell is complete, polymerizing thereon an outer shell comprising a fourth polymer comprising or consisting of, or consisting essentially of, as polymerized units, up to 100% by weight of methyl methacrylate and optionally between 0 and 10% by weight or between 0 and 9 weight % or between 0 and 8 weight %, or between 0 and 7 weight %, or between 0 and 6 weight %, or between 0 and 5 weight %, or between 0 and 4 weight %, or between 0 and 3 weight %, or between 0 and 2 weight %, or between 0 and 1 weight %, or between 0 and 0.5 weight % of a co-monomer, of a co-monomer, wherein the fourth polymer has a Tg of at least 60° C. and is different from the first, second and third polymers; and D) drying the multi-stage emulsion polymer particles, thereby forming a void in the particles wherein the core forms an interior shell.

Further areas of applicability will become apparent from the description provided herein. It should be understood that the description and specific examples are intended for purposes of illustration only and are not intended to limit the scope of the present disclosure.

DETAILED DESCRIPTION OF THE INVENTION

Figure 1:
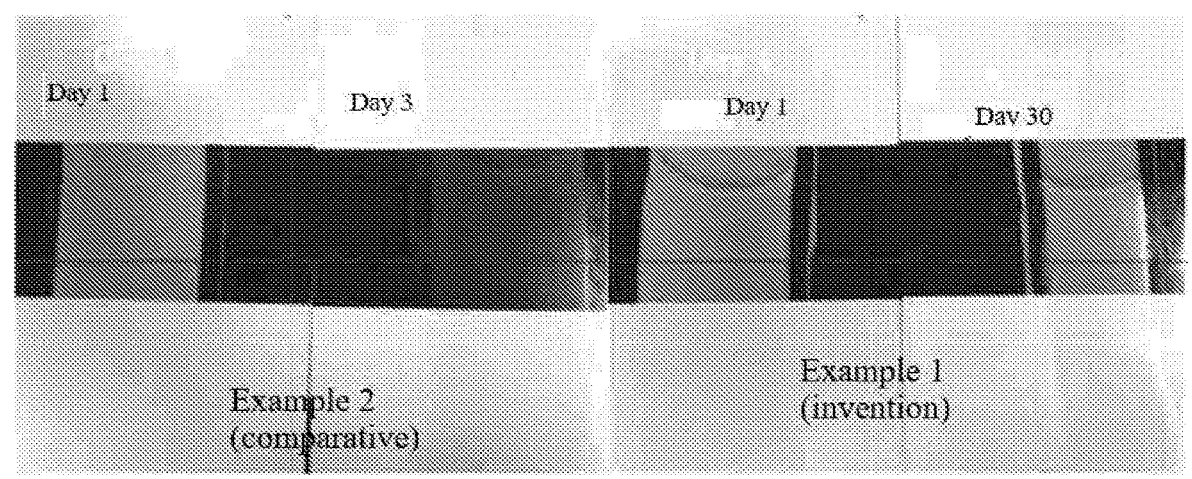
FIG. 1 is a photograph of dried coatings made from aged and unaged coating compositions that comprise comparative voided particles or voided particles according to an embodiment of the invention.
Figure 2:
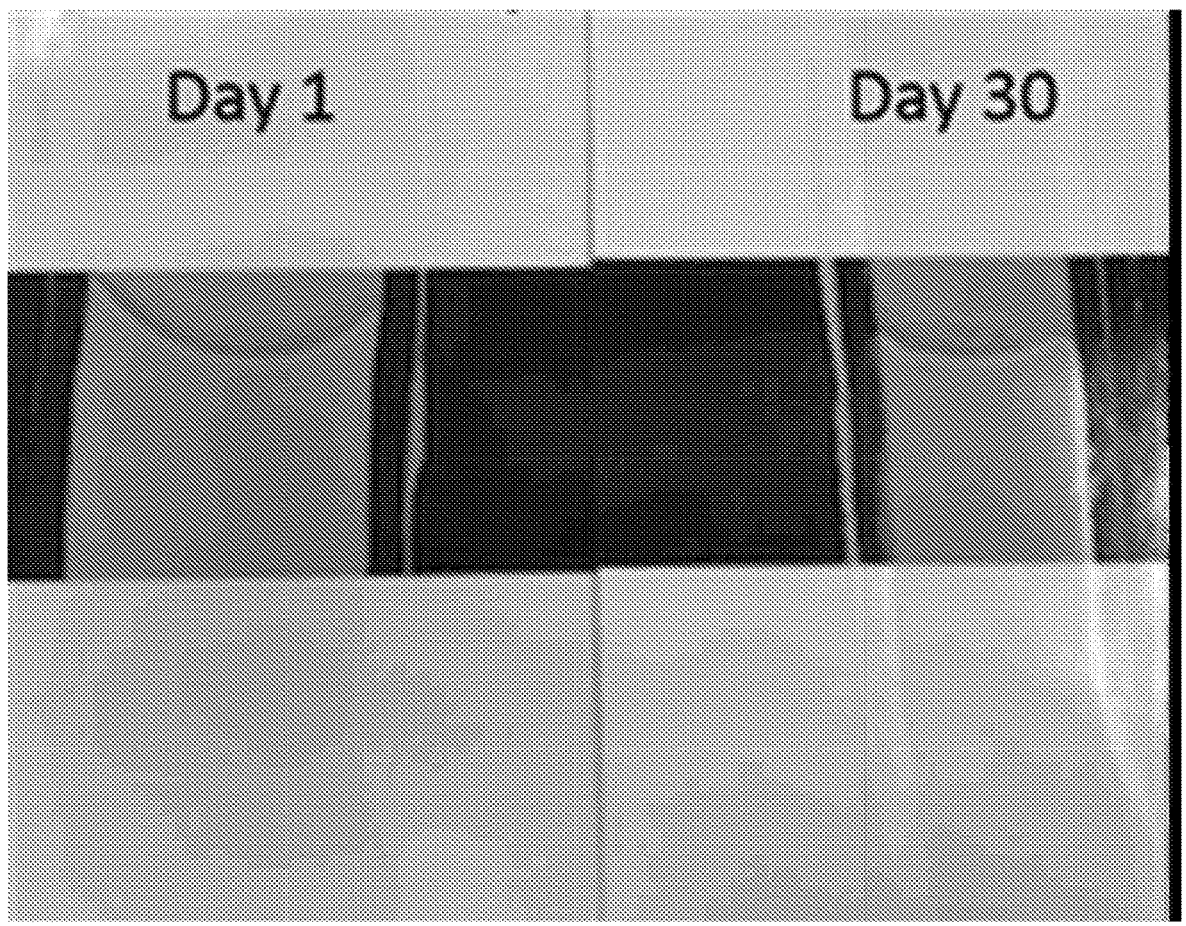
FIG. 2 is a photograph of dried coatings made from aged and unaged coating compositions that comprise voided particles according to an embodiment of the invention.
Figure 3:
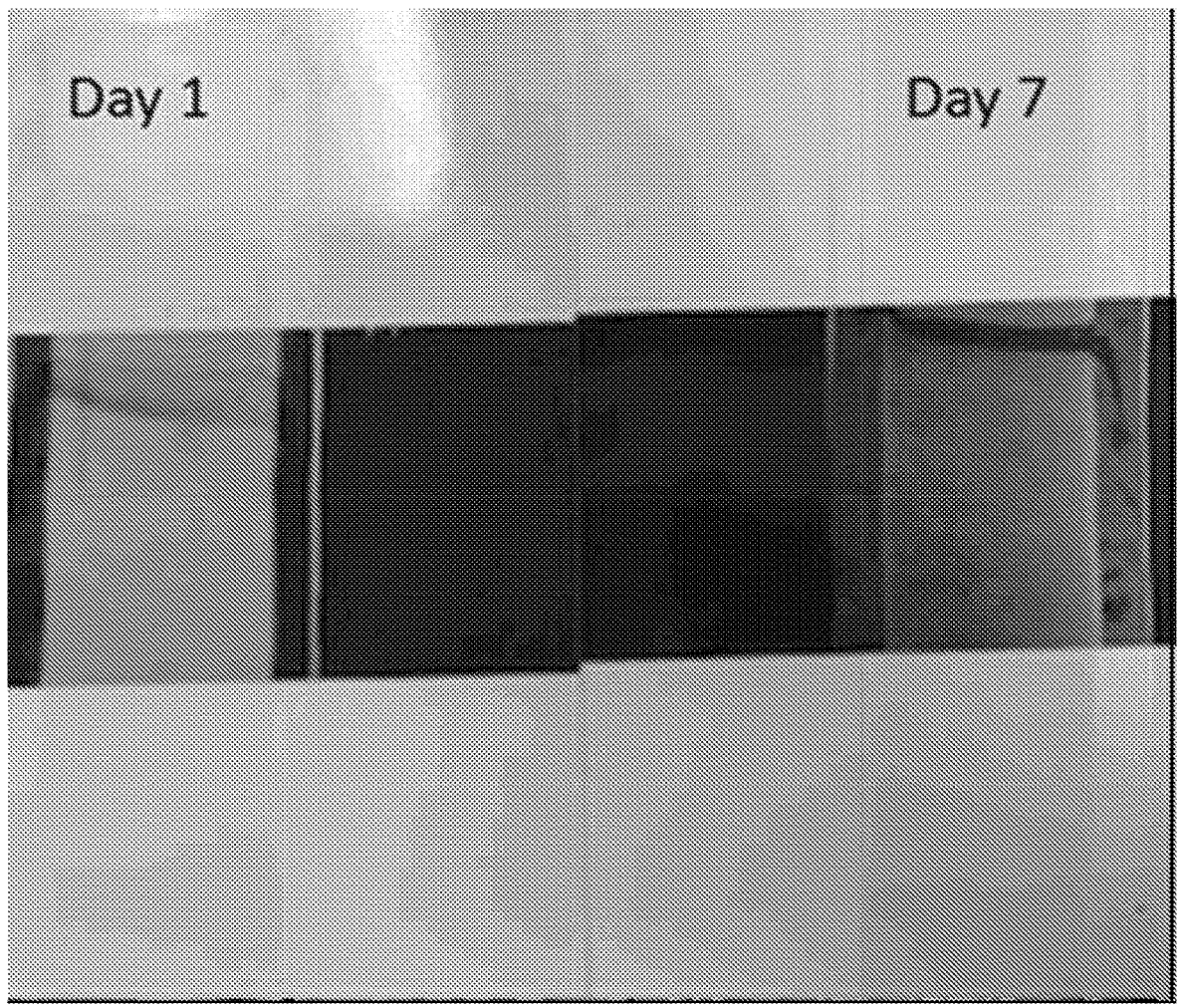
FIG. 3 is a photograph of dried coatings made from aged and unaged coating compositions that comprise comparative voided particles.

The following description is merely exemplary in nature and is in no way intended to limit the present disclosure or its application or uses. For example, the opacifiers made and used in coating compositions according to the teachings contained herein are described throughout the present disclosure in conjunction with an architectural coating comprising an organic solvent in order to more fully illustrate the compositions and the uses thereof.

Unless otherwise indicated, all percentages herein are weight percentages.

The voided latex particles as described herein substantially maintain their structural integrity—i.e. they do not collapse when placed in contact with organic solvents and thus lose the interior void which is critical for the opacifying effect. This is a surprising effect since, as will be described in detail herein, the outer layer may comprise, as polymerized units, up to 100% of methyl methacrylate. A skilled worker is aware that poly (methyl methacrylate) (PMMA) is not considered to be resistant to organic solvents.

The voided latex particles of the present invention may be characterized as being "non-film-forming." By "non-film-forming" it is meant that the voided latex particles will not form a film at ambient temperature or below, or in other words will only form a film at temperatures above ambient temperature. For the purposes of this specification, ambient temperature is taken as being in the range of 15° C. to 45° C. Thus, for example, when incorporated into an aqueous coating composition, applied to a substrate and dried or cured at ambient temperature or below, the voided latex particles do not form a film. The voided latex particles generally remain as discrete particles in the dried or cured coating. The voided latex particles are capable of functioning as opacifiers; that is, when added in sufficient amount to a coating composition that would otherwise be transparent when dried, they render the dried coating composition opaque.

By the term "opaque", it is meant that the coating composition has a higher Y Reflectance when the voided latex particles of the present invention are present in a coating composition as compared to the same coating composition not including the voided latex particles of the present invention, wherein the Y Reflectance is measured according to ASTM D2805-11 (2018) after the coatings are dry to the touch.

The term "outer shell polymer" or "outer layer" refers to the outer layer of the particle of the present invention which is formed after the swelling step.

The terms "layer" and "shell" as used herein may be considered to be interchangeable.

The terms "paint" and "coating" as used herein may be considered to be interchangeable.

The voided latex particles of the invention generally comprise a hollow interior, an interior shell which may enclose or may partially enclose or may be adjacent to the hollow interior and is comprised of a first polymer which is hydrophilic and swellable with an aqueous base. Alternatively in another embodiment, the first polymer may be hydrophilic and swellable with an aqueous acid. As used herein, the term "hydrophilic" is used according to its ordinary meaning. This first polymer thus comprises the "core" as described herein, and after the void is formed the core becomes the interior shell, which as described above, may surround the void, or may partially surround the void or may be adjacent to the void. The particle also comprises an outer shell, which encloses the interior shell (the former "core"). As will be explained subsequently in more detail, one or more intermediate shell layers may or may not be present between the outer shell and the interior shell of each particle. Generally speaking, the voided latex particles may have a diameter of at least 200 nm, at least 250 nm, at least 300 nm, at least 350 nm, or at least 400 nm and a diameter of not more than 1200 nm, not more than 700 nm, not more than 650 nm, not more than 600 nm, not more than 550 nm, or not more than 500 nm. The hollow interior generally has a diameter of at least 100 nm, at least 150 nm, or at least 200 nm, but typically is not more than 600 nm or not more than 500 nm or not more than 400 nm in diameter. The total thickness of the layers surrounding the hollow interior, and also any additional layers which may be present, excluding the outer shell, generally is from 30 to 120 nm. Typically, the voided latex particles will be approximately spherical in shape, although oblong, oval, teardrop or other shapes are also possible.

The outer shell, as will be discussed in more detail herein may be thinner than the total of the thickness of the interior shell and any intermediate shell layers. In particular the outer shell may be between 1 and 100 nm thick. The outer shell may be 5, 10, 15, 20, 25, 30, 35, 40, 45, 50, 55, 60, 65, 70, 75, 80, 85, 90, 95 nm thick. The outer shell need not be of uniform thickness, however. The outer shell is polymeric and may, for example, be comprised of a thermoplastic polymer. The outer shell polymer has a glass transition temperature (Tg) above ambient temperature, typically at least above 45° C., at least above 50° C., at least above 60° C., at least above 70° C., at least above 80° C. or at least above about 90° C. The Tg of the outer shell polymer may be, for example, from 60° C. to 140° C. The outer shell polymer may be a methyl methacrylate homopolymer, or it may be a copolymer comprised of recurring polymerized units of methyl methacrylate and one or more different co-monomers, especially ethylenically unsaturated monomers such as those capable of being polymerized by free radical polymerization. If the outer shell comprises a co-monomer, the co-monomer may be present at from 0% to 10% by weight, or from 0% to 5% by weight or from 0% to 2% by weight, or from 0% to 1% by weight or from 0% to 0.5% by weight or from 0% to 0.1% by weight.

The voided latex particles of the present invention may be prepared by different methods, including, for example, by processes which utilize multi-stage emulsion polymerization. The multi-stage emulsion polymer particles may comprise a core comprising a polymer of at least one hydrophilic monoethylenically unsaturated monomer and an outer shell comprising an outer shell polymer that comprises or consists of or consists essentially of, as polymerized units, at least 90 weight percent or at least 95 weight percent or at least 97 weight percent or at least 99 weight percent or at least 99.5 weight percent or at least 99.9 weight percent or up to 100% by weight of methyl methacrylate. Further, the outer shell comprises, on a weight percentage basis, depending on the size and thickness of the core, the void and any intermediate layers, at least a high enough percentage of the total weight of the particle to result in an outer shell thickness of at least 1 nm. For example, the outer shell polymer may comprise at least 10 weight percent of the total weight of the voided latex polymer particle.

The process of the present invention may be performed by using a batch process where the product of one stage is used in the stage that follows. For instance, the product of the core stage may be used to prepare the product of the next stage, be it an outer shell or an intermediate encapsulating polymer shell stage. Similarly, the outer shell stage may be prepared from the product of the core stage or, when there are one or more encapsulating polymer shell stages, an intermediate encapsulating polymer shell stage.

The core, i.e. the nascent interior shell, component of the multi-stage emulsion polymer particles is generally located at or near the center of such particles. However, in one embodiment, the core may coat and surround a seed which is comprised of a polymer different from the polymer used to prepare the core. In this embodiment, for example, the seed may comprise a polymer which is non-hydrophilic in character; i.e., the seed polymer may be a homopolymer or copolymer of one or more non-ionic monoethylenically unsaturated monomers such as methyl methacrylate. In one embodiment, the seed polymer is a methyl methacrylate homopolymer which is resistant to swelling by the swelling agent used to swell the core. The seed typically has a particle size of from about 30 to about 200 nm or from about 50 to about 100 nm. To form the core, the seed may be coated with another polymer which is comprised of at least one hydrophilic monoethylenically unsaturated monomer, optionally in combination with at least one non-hydrophilic monoethylenically unsaturated monomer such as an alkyl (meth) acrylate and/or a vinyl aromatic monomer. Sufficient hydrophilic monoethylenically unsaturated monomer should be used, however, such that the resulting polymer is capable of being swollen with a swelling agent such as an aqueous base. In one embodiment, for example, the polymer used to coat the seed and provide the core component is a copolymer of methyl methacrylate and methacrylic acid, the methacrylic acid content of the copolymer being about 30 to about 60 weight percent. As described herein, this core ultimately becomes the interior shell of the particle and may surround the void, or partially surround the void or be adjacent the void and thus be located in the interior of the voided latex particle as described herein.

The core comprises a hydrophilic component that provides a sufficient degree of swelling for hollow or void formation. In some embodiments, the hydrophilic component is provided in the form of a hydrophilic monomer used to prepare the core polymer (i.e., a polymer used to obtain the core includes polymerized units of a hydrophilic monomer, in an amount effective to render the core polymer hydrophilic). In other embodiments, the hydrophilic component is an additive to the core (for example, the hydrophilic component may be admixed with a non-hydrophilic polymer). In further embodiments, the hydrophilic component is present both as an additive embedded in the core and as a hydrophilic polymer which is part of the core. In some embodiments, the hydrophilic component is an acid-containing monomer or additive, such as a monomer or additive bearing carboxylic acid functional groups. In some embodiments, the hydrophilic component is a base-containing monomer or additive, such as a monomer or additive bearing amine functional groups or monomers as such as vinylpyridine, 2-(dimethylamino)-ethyl methacrylate, 2-(tert-butylamino)ethyl methacrylate, or 3-(dimethylamino)propyl methacrylamide.

The hydrophilic component of the core may be provided by polymerization or copolymerization of one or more monoethylenically unsaturated monomers bearing a hydrophilic functional group such as a carboxylic acid group or some other type of ionizable functional group. In some embodiments, such a monoethylenically unsaturated monomer is co-polymerized with at least one nonionic monoethylenically unsaturated monomer.

Examples of hydrophilic monoethylenically unsaturated monomers useful for making the core/interior shell polymer include monoethylenically unsaturated monomers containing acid-functionality such as monomers containing at least one carboxylic acid group including acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate, monomethyl itaconate and the like. In certain embodiments, the hydrophilic monoethylenically unsaturated monomer is acrylic acid or methacrylic acid.

A preferred hydrophilic monoethylenically unsaturated monomer containing acid-functionality useful for making the core/interior shell polymer is methacrylic acid.

Examples of hydrophilic non-polymeric components that may be present in the core/interior shell include compounds containing one or more carboxylic acid groups such as aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

The hydrophilic monoethylenically unsaturated monomer may be present in the core polymer in amounts of, as polymerized units, from about 5 to about 80, from about 10 to about 80, from about 20 to about 80, from about 30 to about 70, from about 30 to about 60, from about 40 to about 60, or from about 30 to about 50, percent by weight, based on the weight of core polymer.

The core/interior shell polymer may additionally contain recurring units derived from non-ionic monomers. Examples of non-ionic monomers that may be present in polymerized form in the swellable core polymer include vinyl aromatic monomers such as styrene, α-methyl styrene, p-methyl styrene, t-butyl styrene, or vinyltoluene, olefins such as ethylene, vinyl acetate, vinyl chloride, vinylidene chloride, (meth)acrylonitrile, (meth)acrylamide, (C1-C20) alkyl or (C3-C20) alkenyl esters of (meth)acrylic acid, such as methyl (meth)acrylate, ethyl (meth)acrylate, butyl (meth)acrylate, 2 ethylhexyl (meth)acrylate, hydroxyethyl(meth)acrylate, hydroxypropyl(meth)acrylate, benzyl (meth)acrylate, lauryl (meth)acrylate, oleyl (meth)acrylate, palmityl (meth)acrylate, stearyl (meth)acrylate and the like.

Preferred non-ionic monomers present in the core/interior shell are styrene and methylmethacylate including a combination thereof.

The core/interior shell polymer may further contain polyethylenically unsaturated monomer in amounts, as polymerized units, of 0.1 to 20 percent. Examples of suitable polyethylenically unsaturated monomers include co monomers containing at least two polymerizable vinylidene groups such as α,β ethylenically unsaturated monocarboxylic acid esters of polyhydric alcohols containing 2-6 ester groups. Such co-monomers include alkylene glycol diacrylates and dimethacrylates, such as for example, ethylene glycol diacrylate; ethylene glycol dimethacrylate; 1,3-butylene glycol diacrylate; 1,4-butylene glycol diacrylate; propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide; methylene bis-methacrylamide; divinyl benzene; vinyl methacrylate; vinyl crotonate; vinyl acrylate; vinyl acetylene; trivinyl benzene; triallyl cyanurate; divinyl acetylene; divinyl ethane; divinyl sulfide; divinyl ether; divinyl sulfone; diallyl cyanamide; ethylene glycol divinyl ether; diallyl phthalate; divinyl dimethyl silane; glycerol trivinyl ether; divinyl adipate; dicyclopentenyl (meth)acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The multi-stage emulsion polymer particles may contain one or more intermediate encapsulating polymer layers. The intermediate encapsulating polymers partially or fully encapsulate the core/interior shell. Each encapsulating polymer intermediate layer (also referred to as a "shell") may be partially or fully encapsulated by another encapsulating polymer layer. Each encapsulating polymer intermediate layer may be prepared by conducting an emulsion polymerization in the presence of the core or a core encapsulated by one or more encapsulating polymer layers. An intermediate encapsulating polymer layer may function as a compatibilizing layer, sometimes referred to as a tie or tie coat layer, between other layers of the multi-stage emulsion polymer particles; for example, an intermediate encapsulating polymer layer may help adhere other intermediate layers to each other if more than one intermediate layers are present, or an intermediate layer may help the outer shell adhere to the core. An intermediate encapsulating polymer layer may also serve to modify certain characteristics of the final voided latex particles.

At least one intermediate encapsulating polymer may contain, as polymerized units, one or more hydrophilic monoethylenically unsaturated monomers and one or more nonionic monoethylenically unsaturated monomers. The hydrophilic monoethylenically unsaturated monomers and the nonionic monoethylenically unsaturated monomers useful for making the core are also useful for making such an intermediate encapsulating polymer. Generally, however, the intermediate encapsulating polymer contains a lower proportion of hydrophilic monomer than the core polymer, such that the intermediate encapsulating polymer swells less when contacted with the swelling agent. Other intermediate encapsulating polymers may contain, as polymerized units, non-ionic monoethylenically unsaturated monomer. Examples of non-ionic monomers that may be present in polymerized form in the intermediate encapsulating polymers include vinyl aromatic monomers such as styrene, α-methyl styrene, p-methyl styrene, t-butyl styrene, or vinyltoluene, olefins such as ethylene, vinyl acetate, vinyl chloride, vinylidene chloride, (meth)acrylonitrile, (meth) acrylamide, (C1-C20) alkyl or (C3-C20) alkenyl esters of (meth)acrylic acid, such as methyl (meth)acrylate, ethyl (meth)acrylate, butyl (meth)acrylate, 2 ethylhexyl (meth)

acrylate, hydroxyethyl(meth)acrylate, hydroxypropyl(meth) acrylate, benzyl (meth)acrylate, lauryl (meth)acrylate, oleyl (meth)acrylate, palmityl (meth)acrylate, stearyl (meth)acrylate and the like.

Preferred non-ionic monomers that may be present in polymerized form in the intermediate encapsulating polymers are styrene and methylmethacrylate including a combination thereof.

The intermediate encapsulating polymers may further include crosslinking agents such as alkylene glycol diacrylates and dimethacrylates, such as for example, ethylene glycol diacrylate; ethylene glycol dimethacrylate; 1,3-butylene glycol diacrylate; 1,4-butylene glycol diacrylate; propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide; methylene bis-methacrylamide; divinyl benzene; vinyl methacrylate; vinyl crotonate; vinyl acrylate; vinyl acetylene; trivinyl benzene, triallyl cyanurate, divinyl acetylene, divinyl benzene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate, allyl acrylate, diallyl maleate, diallyl fumarate, diallyl itaconate and the like.

The preferred crosslinking agents in the intermediate encapsulating polymers are di-vinyl benzene and/or ethylene glycol dimethacrylate.

The outer shell is polymeric and may, for example, be comprised of a thermoplastic polymer. The outer shell polymer has a glass transition temperature (Tg) above ambient temperature, typically at least 60° C., at least 70° C., at least 80° C. or at least about 90° C. The Tg of the outer shell polymer may be, for example, from 60° C. to 140° C. The outer shell comprises, as polymerized units, methyl methacrylate. The outer shell may also comprise, as polymerized units, between 0 and 10 weight percent, between 0 and 5 weight percent, between 0 and 2 weight percent, between 0 and 1 weight percent, between 0 and 0.5 weight percent of one or more other co-monomers especially ethylenically unsaturated monomers such as those capable of being polymerized by free radical polymerization. Non-limiting examples of suitable co-monomers comprise non-ionic co-monomers, such as vinyl aromatic monomers such as styrene, α methyl styrene, p-methyl styrene, t-butyl styrene, or vinyltoluene, olefins such as ethylene, vinyl acetate, vinyl chloride, vinylidene chloride, (meth)acrylonitrile, (meth)acrylamide, (C1-C20) alkyl or (C3-C20) alkenyl esters of (meth)acrylic acid, such as methyl acrylate, ethyl (meth)acrylate, butyl (meth)acrylate, 2 ethylhexyl (meth) acrylate, hydroxyethyl(meth)acrylate, hydroxypropyl(meth) acrylate, benzyl (meth)acrylate, lauryl (meth)acrylate, oleyl (meth)acrylate, palmityl (meth)acrylate, stearyl (meth)acrylate and the like.

Imidazolidinone (meth)acrylic monomers such as 2-(2-oxo-1-imidazolidinyl)ethyl (meth)acrylates and N-(2-(2-oxo-1-imidazolidinyl)ethyl (meth)acrylamides may be utilized as co-monomers, for example. Other suitable free radical polymerizable ethylenically unsaturated co-monomers containing functional groups useful in the practice of the present invention include, without limitation, acetoacetoxy(meth)acrylates (e.g., acetoacetoxyethyl methacrylate, AAEM), allyl acetoacetate, derivatized methacrylamides such as methyloxalated diacetone (meth)acrylamides, aminoalkyl(meth)acrylates (including dialkyl and monoalkyl aminoethyl(meth)acrylates), and ethylenically unsaturated polymerizable aziridinyl monomers (such as those described, for example, in U.S. Pat. No. 3,719,646, incorporated herein by reference in its entirety for all purposes). Other suitable free radical polymerizable ethylenically unsaturated monomers containing useful functional groups include hydroethylethylene urea methacrylate (HEEUMA) and aminoethylethylene urea methacrylate (AEEUMA). The free radical polymerizable ethylenically unsaturated monomer may contain a plurality of functional groups on each monomer molecule; for example, the monomer may bear two or more urea and/or ureido groups per molecule, such as the compounds described in U.S. Pat. No. 6,166,220 which is incorporated herein by reference in its entirety for all purposes. Illustrative examples of particular free radical polymerizable ethylenically unsaturated monomers suitable for use in the present invention as functionalized monomers include, but are not limited to, aminoethyl acrylate and methacrylate, dimethylaminopropylacrylate and methacrylate, 3-dimethylamino-2,2-dimethylpropyl-1-acrylate and methacrylate, 2-N-morpholinoethyl acrylate and methacrylate, 2-N-piperidinoethyl acrylate and methacrylate, N-(3-dimethylaminopropyl)acrylamide and methacrylamide, N-(3-dimethylamino-2,2-dimethylpropyl)acrylamide and methacrylamide, N-dimethylaminomethyl acrylamide and methacrylamide, N-(4-morpholino-methyl)acrylamide and methacrylamide, vinylimidazole, vinylpyrrolidone, N-(2-methacryloyloxyethyl)ethylene urea, N-(2-methacryloxyacetamidoethyl)-N, allylalkyl ethylene urea, N-methacrylamidomethyl urea, N-methacryloyl urea, 2-(1-imidazolyl)ethyl methacrylate, 2-(1-imidazolidin-2-on)ethylmethacrylate, N-(methacrylamido)ethyl urea, glycidyl (meth)acrylates, hydroxyalkyl(meth)acrylates such as 2-hydroxyethyl(meth) acrylates, gamma-(meth)acryloxypropyltrialkoxysilanes, N,N-dimethyl(meth)acrylamides, diacetone(meth)acrylamides, ethylene glycol (meth)acrylate phosphates, polyethylene glycol (meth)acrylates, polyethylene glycol methyl ether (meth)acrylates, diethylene glycol (meth)acrylates and combinations thereof.

The free radical initiators suitable for the polymerization of the monomers used to prepare the multi-stage emulsion polymer particles as described herein may be any water soluble initiator suitable for aqueous emulsion polymerization. Examples of free radical initiators suitable for the preparation of any of the shell layers of the multi-stage emulsion polymer particles of the present application include hydrogen peroxide, tert-butyl peroxide, alkali metal persulfates such as sodium, potassium and lithium persulfate, ammonium persulfate, and mixtures of such initiators with a reducing agent. The amount of initiator may be, for example, from 0.01 to 3 percent by weight, based on the total amount of monomer.

In some embodiments, a redox polymerization initiator system is used. In a redox free radical initiation system, a reducing agent may be used in conjunction with an oxidant. Reducing agents suitable for the aqueous emulsion polymerization include sulfites (e.g., alkali metal metabisulfite, hydrosulfite, and hyposulfite). In some embodiments, sugars (such as ascorbic acid and isoascorbic acid or an alkali metal (iso)ascorbate salt) might also be a suitable reducing agent for the aqueous emulsion polymerization. In a redox system, the amount of reducing agent may be, for example, from 0.01 to 3 percent by weight based on the total amount of monomer.

Oxidizing agents include, for example, for example, hydrogen peroxide and ammonium or alkali metal persulfates, perborates, peracetates, peroxides, and percarbonates and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. The amount of oxidizing agent may be, for example, from 0.01 to 3 percent by weight, based on the total amount of monomer.

The free radical polymerization temperature typically is in the range of about 10° C. to 100° C. In the case of the persulfate systems, the temperature may be in the range of about 60° C. to about 100° C. In the redox system, the temperature may be in the range of about 30° C. to about 100° C., in the range of about 30° C. to about 60° C., or in the range of about 30° C. to about 45° C. The type and amount of initiator may be the same or different in the various stages of the multi-stage polymerization.

One or more nonionic or ionic (e.g., cationic, anionic) emulsifiers, or surfactants, may be used, either alone or together, during polymerization in order to emulsify the monomers and/or to keep the resulting polymer particles in dispersed or emulsified form. Examples of suitable nonionic emulsifiers include tert-octylphenoxyethylpoly-ethoxyethanol, dodecyloxypolyethoxyethanol, nonylphenoxyethylpolyethoxyethanol, polyethylene glycol 2000 monooleate, ethoxylated castor oil, fluorinated alkyl esters and alkoxylates, polyoxyethylene sorbitan monolaurate, sucrose monococoate, di(2-butyl)phenoxypolyethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylenelauramide, N lauryl-N-polyoxyethyleneamine and polyethylene glycol dodecyl thioether. Examples of suitable ionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpolyethoxyethyl sulfate ammonium salt, sodium styrene sulfonate, sodium dodecyl allyl sulfosuccinate, palmitic acid, palmitoleic acid, stearic acid, oleic acid, linoleic acid, linolenic acid, mixtures of fatty acids (e.g., linseed oil fatty acid), sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium α-olefin (C14-C16)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypolyethoxyethyl sulfate.

The one or more emulsifiers or surfactants are generally used at a level of from zero to 3 percent based on the weight of the monomers. The one or more emulsifiers or surfactants can be added prior to the addition of any monomer charge, during the addition of a monomer charge or a combination thereof. The emulsion and/or at least one intermediate shell and/or at least one outer shell may include or comprise sodium dodecylbenzene sulfonate and optionally other surfactant(s).

Suitable swelling agents are generally bases, including volatile bases such as ammonia, ammonium hydroxide, and volatile lower aliphatic amines, such as morpholine, trimethylamine, and triethylamine, carbonates, hydrogen carbonates, and the like. Fixed or permanent bases such as sodium hydroxide, potassium hydroxide, lithium hydroxide, zinc ammonium complex, copper ammonium complex, silver ammonium complex, strontium hydroxide, barium hydroxide and the like may also be used. Solvents, such as, for example, ethanol, hexanol, octanol, and Texanol® solvent and those described in U.S. Pat. No. 4,594,363, which is incorporated by reference herein for all purposes, may be added to aid in fixed or permanent base penetration. In some embodiments, the swelling agent is ammonia or ammonium hydroxide. An alkali metal hydroxide such as sodium hydroxide is preferred for lack of volatile emissions. The swelling agent may be in the form of an aqueous liquid or a gaseous medium containing a volatile base. The compositions of the outer shell and any intermediate encapsulating layers may be selected so as to be permeable to the swelling agent at ambient temperature or at a moderately elevated temperature. In one embodiment, the swelling agent is contacted with the multi-stage emulsion polymer particles at a temperature somewhat less than the glass transition temperature of an intermediate layer polymer outer shell polymer. For example, the contacting temperature may be 5° C. to 20° C., 10° C. to 30° C., or 5° C. to 40° C. less than an intermediate shell polymer Tg and/or the outer shell polymer Tg.

The hydrophilic component of the core swells when the multi-stage emulsion polymer particles are subjected to a basic swelling agent that permeates the intermediate shells of the multi-stage emulsion polymer particles. In one embodiment of the invention, the hydrophilic component of the core is acidic (having a pH less than 6). Treatment with a basic swelling agent in the presence of the outer shell polymerizing monomer neutralizes the acidity and raises the pH of the hydrophilic component to greater than 6, or to at least about 7, or to at least about 8, or at least about 9, or at least about 10, or to at least about 13, thereby causing swelling by hydration of the hydrophilic component of the core. The swelling, or expansion, of the core may involve partial merging of the outer periphery of the core into the pores of the inner periphery of the layer immediately adjacent to the core (such as the outer shell or an intermediate encapsulating shell) and also partial enlargement or bulging of such adjacent layer and the entire particle overall.

The ratio of the total weight of the core together with any intermediate shell layers to the weight of the outer shell (or "layer") may generally, for example, be in the range of from 3:1 to 100:1, e.g., 4:1, 5:1, 7:1, 10:1, 15:1, 20:1, 25:1, 30:1, 50:1. Furthermore, if more than one intermediate layer (or "shell") is present in the voided particles as described herein, the intermediate layer immediately adjacent the outer layer may be referred to as the penultimate intermediate layer. In the situation where more than one intermediate layers are present, the ratio of the total weight of the core together with intermediate shell layers except for the penultimate layer to the weight of the penultimate layer may generally, for example, be in the range of from 1:5 to 1:20, e.g., 1:8, 1:10, 1:12, 1:15. Thus it is clear that the outer layer of the voided latex particles may be thinner than each of the other layers of the voided latex particles as described herein To decrease the dry density of the final voided latex particles, the amount of polymer in the layers surrounding the inner void may be decreased; however, sufficient polymer should be present such that the void is still encapsulated, such that the particles retain their integrity and are able to impart opacity to a composition comprising organic media.

Methods previously described in the art for producing voided latex particles may adapted for use in the present invention, provided the processes are modified to include polymerization of an outer shell comprising at least 10 wt. % of the total weight of all of the polymeric layers, or sufficient weight of the shell such that the outer layer has at least 1 nm thickness of poly(methyl methacrylate). In one embodiment substantially all of the swelling occurs prior to polymerization of the outer shell. In another embodiment, polymerization of the outer layer may occur before the swelling occurs. In yet another embodiment, polymerization of the outer layer may occur during all or part of the swelling. Previously known methods subject to such modification may include those described, for example, in U.S. Pat. Appln. Publ. Nos. 2017/0240716 A1, 2019/002710 A1, U.S. Pat. Nos. 4,427,836; 4,468,498; 4,594,363; 4,880,842; 4,920,160; 4,985,469; 5,216,044; 5,229,209; and 5,273,824, each of which is incorporated herein by reference in its entirety for all purposes. For example, particles in accordance with the present invention may be made by the addition of the outer shell comprising up to 100 percent methyl methacrylate as described herein to the particles described in the following examples: (1) examples 0-14 of U.S. Pat. No. 4,427,836, (2) examples 0-12 of U.S. Pat. No. 4,468,498, (3) examples 1-4 of U.S. Pat. No. 4,594,363, (4) examples I-IX of U.S. Pat. No. 4,880,842, (5) examples 1-13 of U.S. Pat. No. 4,920,160, (6) examples 1-7 of U.S. Pat. No. 4,985,469, (7) examples 1-7 of U.S. Pat. No. 5,216,044, (8) examples 1-8 of U.S. Pat. No. 5,229,209, and (9) examples 1-50 of U.S. Pat. No. 5,273,824.

"Polymer" as used herein, is meant to include organic molecules with a weight average molecular weight higher than 20,000 g/mol, preferably higher than 50,000 g/mol, as measured by gel permeation chromatography.

Organic Media

Non-limiting examples of solvents that the voided latex particles as described herein may be placed in contact with and still maintain their integrity, as evidenced by providing opacity to the dried coating compositions, include, but are not limited to: mineral spirits; odorless mineral spirits, kerosene, alcohols, including methanol, propanol, butanol, pentanol, diacetone alcohol, diethylene glycol, amyl alcohol, fuel oil, jet fuel, silicone oil, Freon®, hydrofluoroolefins (HFO), hydrochlorofluoroolefins (HCFO), chlorofluorocarbons (CFC), hydrochlorofluorocarbons (HCFC), butyl acetate, and mixtures thereof. When desirable, the organic solvent may be selected from, but is not limited to, aliphatic solvents, aromatic solvents, ketone solvents, glycol ether solvents, ester solvents, and carbonate solvents such as mineral spirits, naphtha, methyl amyl ketone, xylene, toluene, methyl isobutyl ketone, ethyl acetate, diethylene glycol monobutyl ether acetate, ethylene glycol monobutyl ether acetate, dipropylene glycol monobutyl ether acetate, propylene glycol monobutyl ether acetate, ethylene glycol monobutyl ether, isobutyl acetate, n-propyl acetate, ethylene glycol monopropyl ether, ethyl 3-ethoxypropionate, n-butyl propionate, dipropylene glycol monobutyl ether, triethylene glycol monobutyl ether, methyl isoamyl ketone, oxo-hexyl acetate, tripropylene glycol monomethyl ether, aromatic hydrocarbon, propylene glycol phenyl ether, diethylene glycol monomethyl ether, diethylene glycol monoethyl ether acetate, isophorone, methyl propyl ketone, n-butyl acetate, propylene glycol monomethyl ether, para-chlorobenzotrifluoride, acetone, dimethyl carbonate, acetone, t-butylacetate or mixtures thereof.

Coating Compositions; Other Additives

The voided latex particles described herein can be used as opacifiers in coating compositions as are known in the art that also comprise organic solvents such as are listed above. Especially suitable are the type of coating compositions known as alkyds, which typically utilize mineral spirits as the carrier, or solvent. These "alkyd" coating compositions comprise alkyd resins as the film-forming component of the coating. Alkyd resins are polyesters made from the reaction of an alcohol and an acid. A typical process to synthesize an alkyd resin from an oil generally comprises a first step of "alcoholysis", wherein an oil (e.g., fatty acid triglyceride) or mixture of oils, which preferably comprises some unsaturation, is trans esterified with a polyol, such as pentaerythritol, in the presence of a catalyst, to produce a mixture comprising a hydroxyl-functionalized fatty acid ester. This hydroxyl-functionalized fatty acid ester is then reacted with a poly acid and/or an anhydride compound to synthesize the alkyd resin. These compositions can contain other additives such as are known and used in the art. Non-limiting examples of such additives are pigments, tints, emulsifiers, rheology control additives, driers, etc. The coating formulations, especially alkyd coatings utilizing the opacifiers disclosed herein, may be modified by the addition of one or more additives, including without limitation additional polymers, metal driers, pigments or colorants, fillers, dispersants or surfactants, plasticizers, defoamers, thickeners, biocides, solvents, rheology modifiers, wetting or spreading agents, leveling agents, conductive additives, thermal insulating filler, adhesion promoters, anti-blocking agents, anti-cratering agents or anti-crawling agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, and stain resistant agents. Useful crosslinking agents include, but are not limited to, multi-functional isocyanates, melamine resins, and mixtures thereof. Metal driers are catalysts that speed up the oxidative crosslinking reaction of the alkyd resin. Non-limiting examples of metal driers include but are not limited to: neodymium catalysts; vanadium-based catalysts; cobalt-based catalysts; cobalt bis (2-ethylhexanoate); calcium bis (2-hexanoate); zirconium-2-ethylhexanoic salt; 2,2'-bipyridyl; butanone oxime; and mixtures thereof. A "drier package" is considered to be the combination of necessary driers, accelerants and anti-skin additives in the alkyd coating composition that are used to control the cure. Accelerators are additives that contribute to a faster cure but are not, strictly speaking, catalysts. Non-limiting examples of accelerators are 2,2'-bipyridyl and 1,10-phenanthroline. A non-limiting example of a drier package is cobalt bis (2-ethylhexanoate); 2,2'-bipyridyl; calcium bis (2-hexanoate); 2-ethylhexanoic zirconium salt. A typical use level for such a drier package is 2.1% by weight, but the drier package itself as well as selection and levels of individual components in the drier package may be selected and used at levels as are known in the art. Anti-skin agents are used in alkyd coating compositions to prevent the formation of a "skin" on the coating composition during storage. A non-limiting example of an anti-skin agent is butanone oxime (MEKO). Anti-skin agents may be added to the alkyd coating composition at 0.2% by weight, or at levels as are known and used in the art depending on the components of the alkyd paint or coating composition.

Methods of Using Coating Compositions that Comprise the Opacifiers

The product formulations may be applied by conventional techniques, such as dipping, brushing, flowing, or spraying to name a few, onto a variety of substrate surfaces. The substrates may include without limitation, wood, fabricated wood, paper, cardboard, textiles, synthetic resins, ceramics, ferrous metals, non-ferrous metals, stone, concrete, plaster, and the like.

The product formulation may be used in an indoor or outdoor application. Outdoor applications may include, without limitation, metal coating applications. Additional outdoor applications may include, but not be limited to, rail car coating, agricultural machinery coating, automobile parts coating, wood coatings, log cabin coatings and deck stains. The alkyd polymer composition in the product formulation formed thereof may provide coatings for automotive, industrial, construction and residential housing applications, including for example, without limitation, wood stains, porch and deck stains, glossy top coats, traffic paints, general metal coatings, kitchen cabinetry coatings, automobile refinish, lawn and garden equipment coatings, bus and truck top coatings, gloss trim enamels, metal primers, light duty maintenance coatings, furniture coatings, stain blocking coatings, appliance coatings, dumpster coatings, heavy duty equipment coatings, industrial equipment coatings, and sash and trim enamels. The product formulations may also be useful for adhesive and ink applications.

Test Methods:

Opacity:

Opacity is reported as the Y Reflectance measurement using a BYK-Gardner colorimeter on dried coating compositions formed on black Leneta substrates with a 3 mil draw-down. The tests were conducted according to ASTM D2805-11 (2018). Higher reflectance value is associated with improved opacity. The coating compositions were dried for 24 hours at 25° C. and 50% relative humidity before testing.

Aging:

Coating compositions were aged according to the following protocol. Coating composition samples were made and placed in sealed one liter containers. The sealed containers were stored for the indicated amount of time (e.g. 1 day; 3 days, 7 days, 30 days) at the indicated temperature (25° C. or 50° C.) and then applied to a substrate, dried and evaluated. Therefore, when "aged" or "stored" test results are present herein, it should be understood that the results refer to a dried coating composition, but the coating composition was aged or stored in its undried state, in a sealed container, such as would be expected for an architectural paint in a sealed can that is sitting on a store shelf or in a warehouse for a period of time after being made, prior to being applied to a substrate, such as wall in a house.

Integrity of Particles in Contact with an Organic Solvent:

As used herein, the term, "substantially maintain integrity" in reference to the voided latex particles means that the opacity of a dried coating layer formed from an aged for at least 7 days, at least 10 days, at least 14 days, at least 21 days, at least 30 days at 25° C. or at 50° C. undried reference coating composition described below is at least 50%, at least 55%, at least 60%, at least 65%, at least 70%, at least 75%, at least 80%, at least 85%, at least 90%, at least 95% of the opacity of a dried coating layer formed from the same reference composition that has not been aged or has been aged for one day or less than one day at 25° C. or 50° C. The Y Reflectance of a dried coating sample produced from the reference alkyd coating composition comprising essentially no $TiO_2$ and utilizing the inventive opacifier described herein should be at least 25, at least 26, at least 27, at least 28, at least 29, at least 30, at least 31, at least 32, at least 33, at least 34, at least 35 after 1 day of storage at 25° C. when measured according to the method described below. This minimum is to ensure that the opacifier has good hiding ability in its unaged state or after only 1 day of storage at 25° C., which it retains after aging for longer, i.e. 30 days. Thus, after aging or storing the reference alkyd coating composition described below comprising the inventive opacifier disclosed herein for 30 days at 25° C., a dried film produced from the reference alkyd coating composition will have a Y Reflectance value of at least 13, at least 14, at least 15, at least 16, at least 17, at least 18, at least 19, at least 20, at least 21, at least 22, at least 23, at least 24, at least 25, at least 26, at least 27, at least 28, at least 29, at least 30, at least 31, at least 32, at least 33, at least 34. The opacity is measured by Y Reflectance of the dried coating compositions using the Y Reflectance measurement protocol described above.

The reference alkyd coating composition which all of the above measurements refer to, prior to drying, consists of:

19.5 weight percent of % odorless mineral spirits;

58.6 weight % of a long oil alkyd which comprises 70 weight % solids in odorless mineral spirits;

2.1 weight percent of a drier package comprising cobalt bis (2-ethylhexanoate), 2,2'-bipyridyl, calcium bis (2-hexanoate), 2-ethylhexanoic zirconium salt; 0.1 weight percent of an emulsifier comprising 2-amino-2-methyl propanol;

0.2 weight percent of an anti-skin agent comprising butanone oxime; and 19.5 weight % of an aqueous suspension comprising 30 weight percent of the voided latex particles as disclosed herein.

It is to be understood that the reference alkyd coating composition described herein is intended to provide a specific, measurable basis for determining whether the inventive voided latex particles substantially maintain integrity in a coating composition that comprises an organic solvent. The invention and this disclosure thereof is not intended to limit the use of these particles to this specific reference coating composition.

Gloss:

Gloss of dried coating compositions is measured at 20, 60 and 85 degrees with a colorimeter from BYK-Gardner according to ASTM D3928-00a(2018) on dried 3 mil draw-downs on black Leneta substrates.

Viscosity:

Viscosity measurements are reported as Krebs units and measured with a Brookfield Synchro-Lectric viscometer according to Viscosity Measurement Test Method A as detailed in ASTM D2196-18e1 at 25° C.

Various non-limiting aspects of the invention may be summarized as follows:

Aspect 1: Voided latex particles comprising from the interior outwards:

a hollow interior;

an interior shell comprised of a first polymer, wherein the first polymer is hydrophilic and swellable with an aqueous swelling solution;

a first intermediate shell comprised of a second polymer different from the first polymer wherein the second polymer comprises, as polymerized units, one or more free radical polymerizable hydrophilic monoethylenically unsaturated monomers and one or more free radical polymerizable non-ionic monoethylenically unsaturated monomers;

a second intermediate shell comprised of a third polymer different from the first polymer and the second polymer wherein the third polymer comprises, as polymerized units, one or more free radical polymerizable non-ionic monoethylenically unsaturated monomers, and wherein the third polymer has a Tg of at least 60° C.; and an outer shell comprised of a fourth polymer different from the first, second and third polymers and wherein the fourth polymer comprises, as polymerized units, up to 100% by weight of methyl methacrylate and optionally between 0 and 10 weight percent of a co-monomer, and wherein the fourth polymer has a Tg of at least 60° C.;

wherein the voided latex particles have an outer diameter between 50 nm and 1000 nm and wherein when the voided latex particles are formulated into an alkyd coating composition comprising, by weight of the alkyd coating composition:
  a) 19.5 weight percent of an aqueous suspension comprising 30 wt % of the voided latex particles,
  b) 58.6 weight percent of a long oil alkyd comprising 70 wt % solids in odorless mineral spirits,
  c) 19.5 weight percent of odorless mineral spirits,
  d) 0.1 weight percent of an emulsifier comprising 2-amino-2-methyl propanol, and
  e) 2.1 weight percent of a drier package comprising cobalt bis (2-ethylhexanoate); 2,2'-bipyridyl; calcium bis (2-hexanoate); 2-ethylhexanoic zirconium salt; and
  f) 0.2 weight percent of butanone oxime,
and the alkyd coating composition is stored for 30 days at 25° C., a dried film produced from the alkyd coating composition stored for 30 days has a Y Reflectance of at least 25 when measured according to ASTM D2805-11 (2018).

Aspect 2: The voided latex particles according to Aspect 1 wherein the Y Reflectance of a dried film produced from the alkyd coating composition stored for 30 days is at least 50% of a Y Reflectance of a dried film produced from the alkyd coating composition stored for 1 day.

Aspect 3: The voided latex particles according to any of Aspects 1 and 2, wherein the fourth polymer comprises between 0% and 5% by weight of the co-monomer.

Aspect 4: The voided latex particles according to any of Aspects 1-3, wherein the fourth polymer comprises 0% of co-monomer.

Aspect 5: The voided latex particles according to any of Aspects 1-4, wherein the co-monomer is selected from the group consisting of styrene, α-methyl styrene, p-methyl styrene, t-butyl styrene, vinyltoluene, ethylene, vinyl acetate, vinyl chloride, vinylidene chloride, acrylonitrile, methacrylonitrile, acrylamide, meth acrylamide, methyl acrylate, ethyl acrylate, ethyl methacrylate, butyl methacrylate, 2-ethylhexyl methacrylate, hydroxyethylmethacrylate, hydroxypropyl methacrylate, benzyl methacrylate, lauryl methacrylate, oleyl methacrylate, palmityl methacrylate, stearyl methacrylate, butyl acrylate, 2-ethylhexyl acrylate, hydroxyethylacrylate, hydroxypropylacrylate, benzyl acrylate, lauryl acrylate, oleyl acrylate, palmityl acrylate, stearyl acrylate, and mixtures thereof.

Aspect 6: The voided latex particles according to any of Aspects 1-5, wherein the outer shell has a thickness of from 1 nm to 100 nm.

Aspect 7: The voided latex particles according to any of Aspects 1-5, wherein the outer shell has a thickness of from 10 nm to 50 nm.

Aspect 8: The voided latex particles according to any of Aspects 1-7, wherein the free radical polymerizable non-ionic monoethylenically unsaturated monomer in the third polymer comprises an aromatic monoethylenically unsaturated monomer and the third polymer further comprises, as polymerized units, a crosslinking agent.

Aspect 9: The voided latex particles according to any of Aspects 1-7, wherein the aromatic monoethylenically unsaturated monomer in the third polymer comprises styrene and the crosslinking agent comprises divinyl benzene.

Aspect 10: The voided latex particles according to any of Aspects 1-9, wherein the hydrophilic monoethylenically unsaturated monomer in the second polymer comprises a carboxylic acid group and the aqueous swelling solution is basic.

Aspect 11: The voided latex particles according to any of Aspects 1-10, wherein the hydrophilic monoethylenically unsaturated monomer in the second polymer comprises methacrylic acid and the non-ionic monoethylenically unsaturated monomer in the second polymer comprises methyl methacrylate.

Aspect 12: The voided latex particles according to any of Aspects 1-11, wherein the non-ionic monoethylenically unsaturated monomer in the second polymer further comprises styrene.

Aspect 13: A process for forming voided latex particles, wherein the process comprises the steps of:
  a) contacting an aqueous swelling solution with multi-stage emulsion polymer particles during the production of the multi-stage emulsion polymer particles, wherein the multi-stage emulsion polymer particles comprise from the interior outwards:
    i) a core comprised of a first polymer wherein the first polymer is hydrophilic and swellable with the aqueous swelling solution;
    ii) a first intermediate shell comprised of a second polymer different from the first polymer wherein the second polymer is permeable to the aqueous swelling solution and comprises, as polymerized units, one or more hydrophilic monoethylenically unsaturated monomers and one or more non-ionic monoethylenically unsaturated monomers;
    iii) a second intermediate shell comprised of a third polymer different from the first polymer and the second polymer, wherein the third polymer is permeable to the aqueous swelling solution, has a Tg of at least 60° C. and comprises, as polymerized units, one or more non-ionic monoethylenically unsaturated monomers;
  b) allowing the aqueous swelling solution to swell the core during the polymerization of the second intermediate shell;
  c) when the polymerization of the second intermediate shell is complete, polymerizing thereon an outer shell comprising a fourth polymer comprising, as polymerized units, up to 100% by weight of methyl methacrylate and optionally between 0 and 10 weight percent of a co-monomer, wherein the fourth polymer has a Tg of at least 60° C. and is different from the first, second and third polymers;
  d) drying the multi-stage emulsion polymer particles, thereby forming a void in the particles wherein the core forms an interior shell and producing voided latex particles;
  wherein, when the voided latex particles are formulated into an alkyd coating composition comprising, by weight of the alkyd coating composition:

A) 19.5 weight percent of an aqueous suspension comprising 30 wt % of the voided latex particles,
B) 58.6 weight percent of a long oil alkyd comprising 70 wt % solids in odorless mineral spirits,
C) 19.5 weight percent of odorless mineral spirits,
D) 0.1 weight percent of an emulsifier comprising, and
E) 2.1 weight percent of a drier package comprising cobalt bis (2-ethylhexanoate); 2,2'-bipyridyl; calcium bis (2-hexanoate); 2-ethylhexanoic zirconium salt; and
F) 0.2 weight percent of butanone oxime,
and the alkyd coating composition is stored for 30 days at 25° C., a dried film produced from the stored alkyd coating composition has a Y Reflectance of at least 25 when measured according to ASTM D2805-11 (2018).

Aspect 14: The process according to Aspect 13, wherein the outer shell has a thickness of between 1 nm and 100 nm.

Aspect 15: The process according to any of Aspects 13 and 14, wherein the free radical polymerizable non-ionic monoethylenically unsaturated monomer in the third polymer comprises an aromatic monoethylenically unsaturated monomer and the third polymer further comprises, as polymerized units, a crosslinking agent.

Aspect 16: The process according to any of Aspects 13-15, wherein the hydrophilic monoethylenically unsaturated monomer in the second polymer comprises a carboxylic acid group and the aqueous swelling solution is basic.

Aspect 17: The process according to any of Aspects 13-16, wherein the hydrophilic monoethylenically unsaturated monomer in the second polymer comprises methacrylic acid and the non-ionic monoethylenically unsaturated monomer in the second polymer comprises methyl methacrylate.

Aspect 18: The process according to any of Aspects 13-17, wherein the non-ionic monoethylenically unsaturated monomer in the second polymer further comprises styrene.

Aspect 19: A coating composition comprising voided latex particles wherein the voided latex particles comprise from the interior outwards:
a hollow interior;
an interior shell comprised of a first polymer, wherein the first polymer is hydrophilic and swellable with an aqueous swelling solution;
a first intermediate shell comprised of a second polymer different from the first polymer wherein the second polymer comprises, as polymerized units, one or more free radical polymerizable hydrophilic monoethylenically unsaturated monomers and one or more free radical polymerizable non-ionic monoethylenically unsaturated monomers;
a second intermediate shell comprised of a third polymer different from the first polymer and the second polymer wherein the third polymer comprises, as polymerized units, one or more free radical polymerizable non-ionic monoethylenically unsaturated monomers, and wherein the third polymer has a Tg of at least 60° C.; and
an outer shell comprised of a fourth polymer different from the first, second and third polymers wherein the fourth polymer comprises, as polymerized units, up to 100% by weight of methyl methacrylate and optionally between 0 and 10 weight percent of a co-monomer, and wherein the fourth polymer has a Tg of at least 60° C.;
wherein the voided latex particles have an outer diameter between 50 nm and 1000 nm and;
wherein when the voided latex particles are formulated into an alkyd coating composition comprising, by weight of the alkyd coating composition:
a) 19.5 weight percent of a 30 wt % aqueous suspension of the voided latex particles,
b) 58.6 weight percent of a long oil alkyd comprising 70 wt % solids in odorless mineral spirits,
c) 19.5 weight percent of odorless mineral spirits,
d) 0.1 weight percent of an emulsifier, and
e) 2.1 weight percent of a drier package comprising cobalt bis (2-ethylhexanoate); 2,2'-bipyridyl; calcium bis (2-hexanoate); 2-ethylhexanoic zirconium salt; and
f) 0.2 weight percent of butanone oxime,
and the alkyd coating composition is stored for 30 days at 25° C., a dried film produced from the stored alkyd coating composition has a Y Reflectance of at least 25 when measured according to ASTM D2805-11 (2018).

Aspect 20: The coating composition according to Aspect 19, wherein a thickness of the outer shell is between 1 nm and 100 nm.

Aspect 21: The coating composition according to any of Aspects 19 and 20, wherein the coating is an alkyd coating and the organic solvent comprises odorless mineral spirits.

Aspect 22: The coating composition according to any of Aspects 19 and 21, wherein the organic solvent comprises a solvent selected from the group consisting of mineral spirits, odorless mineral spirits, butyl acetate, and mixtures thereof.

Aspect 23: Voided latex particles, comprising from the interior outwards:
a hollow interior, wherein the hollow interior substantially maintains its integrity after the particle is placed in contact with an organic solvent at 25° C. for 30 days;
an interior shell comprised of a first polymer, wherein the first polymer is hydrophilic and swellable with an aqueous swelling solution;
a first intermediate shell comprised of a second polymer different from the first polymer wherein the second polymer comprises, as polymerized units, one or more free radical polymerizable hydrophilic monoethylenically unsaturated monomers and one or more free radical polymerizable non-ionic monoethylenically unsaturated monomers;
a second intermediate shell comprised of a third polymer different from the first polymer and the second polymer wherein the third polymer comprises, as polymerized units, one or more free radical polymerizable non-ionic monoethylenically unsaturated monomers, and wherein the third polymer has a Tg of at least 60° C.; and
an outer shell comprised of a fourth polymer different from the first, second and third polymers, wherein the fourth polymer comprises, as polymerized units, up to 100% by weight of methyl methacrylate and optionally between 0 and 10 weight percent of a co-monomer, and wherein the fourth polymer has a Tg of at least 60° C.

Aspect 24: The voided latex particles according to Aspect 23, wherein the organic solvent comprises a solvent selected from the group consisting of mineral spirits, odorless mineral spirits, butyl acetate, and mixtures thereof.

Aspect 25: The voided latex particle according to any of Aspects 23 and 24, wherein the organic solvent is odorless mineral spirits.

Aspect 26: The voided latex particles according to any of Aspects 23-25, wherein the fourth polymer comprises between 0% and 5% by weight of the co-monomer.

Aspect 27: The voided latex particles according to any of Aspects 23-26, wherein the fourth polymer comprises 0% of co-monomer.

Aspect 28: The voided latex particles according to any of Aspects 23-27 wherein the co-monomer comprises a co-monomer selected from the group consisting of styrene, α-methyl styrene, p-methyl styrene, t-butyl styrene, vinyltoluene, ethylene, vinyl acetate, vinyl chloride, vinylidene chloride, acrylonitrile, methacrylonitrile, acrylamide, methacrylamide, methyl acrylate, ethyl acrylate, ethyl methacrylate, butyl methacrylate, 2-ethylhexyl methacrylate, hydroxyethylmethacrylate, hydroxypropyl methacrylate, benzyl methacrylate, lauryl methacrylate, oleyl methacrylate, palmityl methacrylate, stearyl methacrylate, butyl acrylate, 2-ethylhexyl acrylate, hydroxyethylacrylate, hydroxypropylacrylate, benzyl acrylate, lauryl acrylate, oleyl acrylate, palmityl acrylate, stearyl acrylate, and mixtures thereof.

Aspect 29: The voided latex particles according to any of Aspects 23-28, wherein the outer shell has a thickness of from 1 nm to 100 nm.

Aspect 30: The voided latex particles according to any of Aspects 23-29 wherein the outer shell has a thickness of from 10 nm to 50 nm.

EXAMPLES

Example 1: Preparation of Voided Latex Particles Modified with Poly(Methyl Methacrylate) According to the Invention The following steps were performed as a multi-stage emulsion polymerization.
Pre-Emulsions:
The following pre-emulsions were prepared:

| | |
|---|---|
| Pre-Emulsion 1 | 60 grams Water, 5 grams of Methacrylic Acid, 40 grams of Methyl Methacrylate, 60 grams of Styrene, 0.5 grams sodium dodecylbenzene sulfonate |
| Pre-Emulsion 2 | 100 g water, 0.5 grams sodium dodecylbenzene sulfonate, 300 grams Styrene, 4.0 grams of di-vinyl benzene. |
| Pre-Emulsion 3 | 20 grams Water, 100 g Methyl Methacrylate, 1.5 grams sodium dodecylbenzene sulfonate |

Initial Reactor Charge:
1) Charge water (900 g) to reactor. Heat reactor to 93-94° C.
Initial Redox Charge:
2) Pre-dissolve sodium persulfate in water and add quickly to the reactor. Add starting emulsion polymer to the reactor. Adjust heat to 76-79° C.
Interior Shell (Also Called Interior Layer) and Intermediate Shells (Also Called Intermediate Layers)
3) Immediately start addition of Pre-Emulsion 1. Add this over 90 minutes.
4) Feed Pre-Emulsion 2 over 65 minutes.
5) Hold for 30 minutes.
6) Increase temperature to 99° C.
7) Feed an aqueous base solution to the reactor to achieve a reactor pH of at least 13 over 30 minutes.
8) Feed 100 g styrene over 10 minutes.
9) Hold for 10 minutes.
10) Start addition of sodium ascorbate (1.4 g in 20 g water) over 50 minutes. At same time, co-feed t-butyl peroxide solution (2 g in 20 g water) over 50 minutes.
Outer Layer (Outer Shell):
11) Immediately after step 25) start the addition of pre-emulsion 3 over 50 minutes. Hold for 30 minutes.
12) Start feed of sodium ascorbate (1.4 g in 20 g water) over 60 minutes. At the same time co-feed t-butyl peroxide solution (2 g in 20 g water) over 60 minutes.

For this Example the theoretical thickness of the outer layer is calculated to be 10 nm.

Example 2: Preparation of Comparative Voided Latex Particle not Having the Outer Layer of Poly(Methyl Methacrylate)

Comparative voided latex particles are prepared according to the same steps as Example 1, except Steps 11), and 12) were omitted and Pre-Emulsion 3 was not prepared. These particles have styrene as the outer layer, rather than the PMMA outer layer of Example 1.

The particles of Example 1 (according to the invention) and Example 2 (comparative) were formulated into alkyd coating compositions as the sole opacifier component. The alkyd coating compositions utilized odorless mineral spirits as the solvent. The two alkyd coating formulations utilizing Example 1 was aged at 25° C. for 1 day and for 30 days. The alkyd coating composition utilizing comparative Example 2 was aged at 25° C. for 1 day and for 3 days. The two compositions were put onto black Leneta substrates with a 3 mil drawdown. The drawdown samples are shown in FIG. 1. On the left is Example 1 after Day 1 and Day 3. It is clear that after just 3 days in contact with the odorless mineral spirits in the alkyd coating compositions, that the alkyd coating utilizing the comparative Example 2 particle is no longer opaque. This loss of opacifying property indicates that the integrity of the particles has not been maintained. In contrast, on the right of FIG. 1, it is clear that the inventive Example 1 particles retain their opacifying property after 30 days, i.e. the inventive particles have retained the integrity of the interior void ten times longer than the comparative Example 2.

Example 3: Preparation of Comparative Voided Latex Particle not Having the Outer Layer of Poly(Methyl Methacrylate), but Having a Thicker Outer Layer of Styrene than Example 2

Comparative voided latex particles are prepared according to the same steps as Example 1, except that styrene is substituted for the methyl methacrylate in Steps 11) and 12), and the Pre-Emulsion 3 is prepared with 100 g styrene, rather than 100 g methyl methacrylate. These particles have styrene as the outer layer, similar to Example 2, but an additional outer layer of pStyrene has been added to the particles rather than the PMMA outer layer of Example 1, thereby allowing determination of whether improvement in resistance to solvent is due only to the thicker outer layer, rather than the presence of methyl methacrylate in the outer layer.

Example 4: Y Reflectance Values of Alkyd Coatings with Example 1 and Example 3 Opacifiers Alkyd coating formulations as shown in Table 1 utilizing odorless mineral spirits as the solvent were formulated and aged at 25° C. for 7 days and 30 days. The Y Reflectance values of 3 mil drawdowns over a black Leneta chart of the coating formulations were then measured with a colorimeter. Lower Y Reflectance values are indicative of poorer hiding power, i.e. reduced opacity. The colorimeter results are shown in Table 2. In addition, the coating samples utilizing Example 1 (according to the invention) voided latex particles after 1 day and 30 days at 25° C. are shown in FIG. 1.

The coating samples utilizing Example 3 (comparative) voided latex particles are shown in FIG. 7 after 1 day and 7 days at 25° C.

TABLE 1

Reference Alkyd Coating Composition for Opacity Measurements

| Component | Compound | grams | Solids weight % | Weight % TOTAL |
|---|---|---|---|---|
| Chempol® 801-7961 (Arkema) (70 wt % solids in mineral spirits) | Long oil alkyd in odorless mineral spirits | 300 | 70 | 58.6 |
| Odorless Mineral Spirits (solvent) | | 100 | | 19.5 |
| AMP-95™ (Angus) (emulsifier) | 2-amino-2-methyl propanol | 0.5 | | 0.1 |
| Opacifier (30 weight percent solids in water) | | 100 | 30 | 19.5 |
| †12% Cobalt drier* | cobalt bis (2-ethylhexanoate) | 1 | | 0.2 |
| XL-Dri (accelerator)* (DURA) | 2,2'-bipyridyl | 1 | | 0.2 |
| †5% Calcium drier* | calcium bis (2-hexanoate) | 4 | | 0.8 |
| †12% Zirconium drier* | 2-ethyhexanoic zirconium salt | 4.5 | | 0.9 |
| Skino® #2 (Anti-skin) (Borchers) | butanone oxime | 1 | | 0.2 |

*These components together comprise the drier package.
†Refers to the amount of active ingredient in a solution, i.e. 12% cobalt drier means 12% by weight of cobalt bis (2-ethylhexanoate) in a solvent and hence, since 0.2% of the solvent and drier together are added, the alkyd coating composition comprises 0.024 weight % of cobalt bis (2-ethylhexanoate).

TABLE 2

Y Reflectance values of alkyd coatings made with odorless mineral spirits as solvent

| | Alkyd coating with Example 1 opacifier which has pMMA 20 nm outer shell and odorless mineral spirits | Alkyd coating with Example 3 opacifier which has pStyrene 20 nm outer shell and odorless mineral spirits |
|---|---|---|
| Aged at 25° C. | Y Reflectance | Y Reflectance |
| 1 Day | 35.46 | 36.25 |
| 7 Days | (not measured) | 12.52 |
| 30 Days | 33.55 | (unmeasurable) |

Note that differences between 1 day and 30 day aged Y Reflectance values with pMMA encapsulated opacifier are due only to non-optimal mixing and a non-optimal draw-down (see smears in drawdown in FIG. 1.)

The results in Table 1 illustrate clearly how than the pMMA-modified particles are considerably more robust in the odorless mineral spirits solvent than the pStyrene-modified particles. The result demonstrates that the surprising solvent resistance of the pMMA-modified particles is due to the pMMA as the outer layer, not the additional outer layer thickness. Notably, the Y Reflectance value after aging at 25° C. for 30 days was 95% of the Y Reflectance value for the samples that were aged for 1 day at 25° C.

Example 5: Opacity of Alkyd Coating Formulations Utilizing Example 1 Polymeric Opacifiers Compared to TiO$_2$ Opacifier in Alkyd Coating The following alkyd coating samples shown in Table 3 were prepared. The amounts are given in grams.

TABLE 3

Alkyd coating formulations

| | TiO$_2$ Only | TiO$_2$ partially replaced Example 1 with voided latex particles |
|---|---|---|
| Chempol® 801-2426 Long oil alkyd (Arkema) | 250 | 250 |
| Disperbyk® 163 Dispersant (Byk) | 3.0 | 3.0 |
| Ti-Pure® R902 + Titanium dioxide (Chemours) | 100.0 | 85.0 |
| Crayvallac® PA4 WDA 12 Rheology modifier (Arkema) | 5.0 | 5.0 |
| Example 1 Opacifier | — | 30.0 |
| Odorless mineral spirits | 96.0 | 50.0 |
| Dryer package | 9.7 | 9.7 |
| BYK-349 Surfactant (Byk) | 1.0 | 1.0 |
| Anti-skin additive | 1.0 | 1.0 |

These two alkyd coating compositions were stored at 50° C. for 4 weeks, and their properties were measured, including viscosity in Krebs units (KU), opacity and gloss. The opacity was measured with a BYK-Gardner colorimeter on dried 3 mil draw-downs over black Leneta substrates according to ASTM D2805-11(2018) and the gloss was measured at 20, 60 and 86 degrees with a BYK-Gardner glossmeter from according to ASTM D3928-00a(2018).

The results are shown in Table 4 below.

TABLE 4

Heat Aged Testing Results of Alkyd Coating Formulations with TiO$_2$ Only, Compared to TiO$_2$ Partially Replaced with Example 1 Voided Latex Particles

| Initial | TiO$_2$ Only | TiO$_2$ partially replaced with Example 1 voided latex particles |
|---|---|---|
| Viscosity (KU) | 73 | 96 |
| Opacity | 96.3 | 96.68 |
| Gloss 20° | 83.6 | 86.6 |
| Gloss 60° | 92.1 | 93.4 |
| Gloss 85° | 98.6 | 99.4 |

| Heat Aged for 4 Weeks at 50° C. | TiO$_2$ Only | TiO$_2$ partially replaced with Example 1 voided latex particles |
|---|---|---|
| Viscosity (KU) | 70 | 96 |
| Opacity | 97.46 | 96.93 |
| Gloss 20° | 85.9 | 86.7 |
| Gloss 60° | 92.7 | 92.9 |
| Gloss 85° | 98.8 | 98.4 |

These results demonstrate that the voided latex particles of the present invention maintains in-can stability, opacity and gloss values after four weeks at elevated temperatures equivalent titanium dioxide opacifiers used in organic medium formulations.

In some embodiments, the invention herein can be construed as excluding any element or process that does not materially affect the basic and novel characteristics of the composition or process. Additionally, in some embodiments, the invention can be construed as excluding any element or process not specified herein.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A coating composition comprising voided latex particles wherein the voided latex particles comprise from interior outwards:
- a hollow interior;
- an interior shell comprised of a first polymer, wherein the first polymer is hydrophilic and swellable with an aqueous swelling solution;
- a first intermediate shell comprised of a second polymer different from the first polymer wherein the second polymer comprises, as polymerized units, one or more free radical polymerizable hydrophilic monoethylenically unsaturated monomers and one or more free radical polymerizable non-ionic monoethylenically unsaturated monomers;
- a second intermediate shell comprised of a third polymer different from the first polymer and the second polymer wherein the third polymer comprises, as polymerized units, one or more free radical polymerizable non-ionic monoethylenically unsaturated monomers, and wherein the third polymer has a Tg of at least 60° C.; and
- an outer shell comprised of a fourth polymer different from the first, second and third polymers wherein the fourth polymer comprises, as polymerized units, up to 100% by weight of methyl methacrylate and optionally between 0 and 10 weight percent of a co-monomer, and wherein the fourth polymer has a Tg of at least 60° C.;

wherein the voided latex particles have an outer diameter between 50 nm and 1000 nm and;

wherein when the voided latex particles are formulated into an alkyd coating composition comprising, by weight of the alkyd coating composition:
- a) 19.5 weight percent of a 30 wt % aqueous suspension of the voided latex particles,
- b) 58.6 weight percent of a long oil alkyd comprising 70 wt % solids in odorless mineral spirits,
- c) 19.5 weight percent of odorless mineral spirits,
- d) 0.1 weight percent of an emulsifier, and
- e) 2.1 weight percent of a drier package comprising cobalt bis (2-ethylhexanoate); 2, 2'-bipyridyl; calcium bis (2-hexanoate); 2-ethyhexanoic zirconium salt; and
- f) 0.2 weight percent of butanone oxime, and the alkyd coating composition is stored for 30 days at 25° C., a dried film produced from the stored alkyd coating composition has a Y Reflectance of at least 25 when measured according to ASTM D2805-11 (2018).

2. The coating composition according to claim 1, wherein a thickness of the outer shell is between 1 nm and 100 nm.

* * * * *